United States Patent
Shigetaka et al.

(10) Patent No.: US 6,535,203 B2
(45) Date of Patent: Mar. 18, 2003

(54) COORDINATE INPUT APPARATUS OPERABLE WITH CONDUCTOR SUCH AS FINGER AND NON-CONDUCTOR SUCH AS PEN

(75) Inventors: Hiroshi Shigetaka, Fukushima-ken (JP); Hideto Matsufusa, Fukushima-ken (JP)

(73) Assignee: Alps Electric Co., Ltd., Tokyo (JP)

(*) Notice: Subject to any disclaimer, the term of this patent is extended or adjusted under 35 U.S.C. 154(b) by 188 days.

(21) Appl. No.: 09/794,944

(22) Filed: Feb. 26, 2001

(65) Prior Publication Data

US 2001/0024194 A1 Sep. 27, 2001

(30) Foreign Application Priority Data

Feb. 29, 2000 (JP) ........................................ 2000-053383

(51) Int. Cl.[7] .............................................. G06K 11/06
(52) U.S. Cl. ..................................... 345/173; 178/18.01
(58) Field of Search .......................... 349/12, 156, 23; 345/178, 156, 173, 174, 179; 178/18, 19, 18.03, 18.01; 73/718

(56) References Cited

U.S. PATENT DOCUMENTS

| | | | | |
|---|---|---|---|---|
| 5,083,118 A | * | 1/1992 | Kazama | 345/174 |
| 5,621,438 A | * | 4/1997 | Kamimura et al. | 345/178 |
| 5,751,382 A | * | 5/1998 | Yamada et al. | 382/104 |
| 5,869,790 A | * | 2/1999 | Shigetaka et al. | 178/18.03 |
| 5,949,501 A | * | 9/1999 | Izuno et al. | 349/23 |
| 6,255,604 B1 | * | 7/2001 | Tokioka et al. | 178/18.01 |
| 6,382,030 B1 | * | 5/2002 | Kihara et al. | 73/718 |

FOREIGN PATENT DOCUMENTS

JP         7-334308        12/1995

* cited by examiner

Primary Examiner—Vijay Shankar
Assistant Examiner—Nitin Patel
(74) Attorney, Agent, or Firm—Brinks Hofer Gilson & Lione

(57) ABSTRACT

A coordinate input apparatus operable with any one of a conductor such as a finger and a non-conductor such as a pen without damaged operability is provided. Furthermore, in order to miniaturize the apparatus and reduce the thickness thereof, in an electrostatic capacitive detection section having a resin sheet and a resist film, a pressure-sensing detection section having a resin sheet, and a substrate, through-holes penetrating from the surface of the resist film to the backside of the substrate are formed. By filling these through-holes with a conductive material, an X-direction-detection electrode is connected to the substrate while an Y-direction-detection electrode is connected to the substrate.

6 Claims, 5 Drawing Sheets

COORDINATE INPUT APPARATUS OPERABLE WITH CONDUCTOR SUCH AS FINGER AND NON-CONDUCTOR SUCH AS PEN

BACKGROUND OF THE INVENTION

1. Field of the Invention

The present invention relates to a pad type coordinate input apparatus, and in particular relates to a coordinate input apparatus operable with both of a conductor such as a finger and a non-conductor such as a pen.

2. Description of the Related Art

As a pointing device for use in a personal computer, a pad type input apparatus is adopted, and it is specifically used for a number of note-type computers. In the type of input apparatus, an operating plane is formed of a planer sheet, and by operating the sheet surface with a finger, etc., coordinate data, in which a mouse-cursor displayed on a screen is moved in the desired direction, for example, can be inputted.

As detecting means of a conventional input apparatus, there are a capacitive type and a pressure-sensing type. The capacitive type detects the coordinates by measuring changes in capacitance while the pressure-sensing type detects the coordinates by measuring changes in voltage. Also, an input apparatus operable with both of a conductor such as a finger and a non-conductor such as a pen by using pressure-sensing type detecting means is commercially available.

However, when the operation with any one of a finger and a pen is to be achieved, the above-mentioned pressure-sensing type input apparatus has low detection sensitivity when operating it with a finger, etc., so that a mouse-cursor cannot be moved to a desired position, thereby impairing the sense of operating touch.

Therefore, an input apparatus having both of a capacitive type input section and a pressure-sensing type input section incorporated thereinto is proposed. However, although the sense of operating touch is not impaired, when electrically connecting from substrates in the capacitive and pressure-sensing sides to the side of a circuit board, the respective lead lines from the capacitive and pressure-sensing substrates to the outside have to be formed so as to insert them into insertion plugs formed in the circuit board, thereby increasing the apparatus in size, and the thickness thereof is further difficult to be reduced.

SUMMARY OF THE INVENTION

The present invention is made so as to solve the above-described problems, and it is an object of the present invention to provide an input apparatus operable without impairment of the sense of operating touch even with any one of a conductor such as a finger and a non-conductor such as a pen, and further capable of reducing the apparatus in size and thickness.

In accordance with the present invention, there is provided a coordinate input apparatus comprising: an electrostatic capacitive detection section for detecting coordinates by operating the electrostatic capacitive detection section with an indicator so as to change the electrostatic capacitance between an X electrode and an Y electrode, which are arranged so as to oppose each other via an insulating layer interposed therebetween; and a pressure-sensing detection section having a resistor and a conductor arranged so as to oppose the resistor, the pressure-sensing detection section detecting coordinates based on the resistance of the resistor at a contact point between the resistor and the conductor when being operated with a predetermined pressure, wherein the electrostatic capacitive detection section is deposited on the operating surface side of the pressure-sensing detection section, wherein the electrostatic capacitive detection section is flexible and is capable of being pressed against the pressure-sensing detection section, and wherein the pressure-sensing detection section comprises a high resistance resistor and a low resistance resistor arranged around the high resistance resistor, a voltage being applied alternately between low resistance resistor portions opposing in an X direction and between low resistance resistor portions opposing in an Y direction so that the coordinates are detected based on a voltage detected between the low resistance resistor and the conductor by causing the conductor to make contact with the high resistance resistor.

As described above, when the low resistance resistors are arranged around the high resistance resistor and the low resistance resistors are used as electrodes opposing in the X direction and the Y direction, changes in resistances in the X direction and the Y direction can be detected with high accuracy and without interference with each other when the high resistance resistor makes contact with the conductor.

It is preferable that a coordinate input apparatus further comprise a substrate arranged in the pressure-sensing detection section opposite to the electrostatic capacitive detection section, the substrate having through-holes penetrating from one face of the substrate toward the other face thereof, the through-hole penetrating through both the electrostatic capacitive detection section and the pressure-sensing detection section so that the X and Y electrodes of the electrostatic capacitive detection section are each connected to the substrate via the through-hole by filling the through-hole with a conductive material.

Preferably, a coordinate input apparatus further comprises a substrate arranged in the pressure-sensing detection section opposite to the electrostatic capacitive detection section, the substrate having through-holes penetrating from one face of the substrate toward the other face thereof, the through-hole penetrating through both the electrostatic capacitive detection section and the pressure-sensing detection section so that the low resistance resistor and the conductor of the pressure-sensing detection section are each connected to the substrate via the through-hole by filling the through-hole with a conductive material.

In this case, on the backside of the substrate, circuit elements for activating the pressure-sensing detection section and/or the electrostatic capacitive detection section are mounted, so that the through-holes and the circuit elements are connected via a circuit pattern formed on the backside of the substrate.

Owing to the above structure, it is not necessary that a lead portion be provided outside for any one of the pressure-sensing detection section and the electrostatic capacitive detection section, resulting in miniaturization of the apparatus and reduction in thickness thereof as well. Furthermore, the number of parts can be reduced, resulting in cost reduction.

Also, the electrostatic capacitive detection section may preferably comprise a face-sheet arranged on the operating face side of the electrostatic capacitive detection section via an insulator disposed therebetween.

For example, on the face of the electrostatic capacitive detection section, an insulator made of a resist film is printed and the face-sheet is fixed thereto via an adhesive.

DESCRIPTION OF THE PREFERRED EMBODIMENTS

Figure 1:
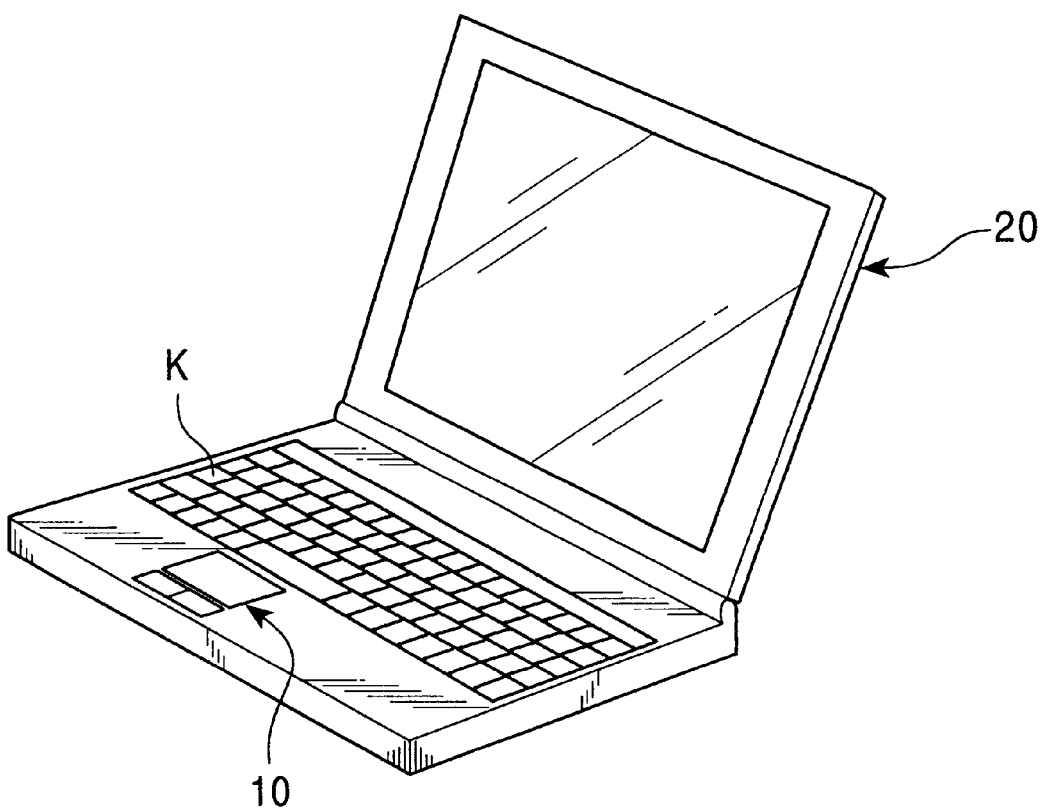
FIG. 1 is a perspective view showing a configuration of a coordinate input apparatus according to the present invention mounted on a computer.
Figure 2:
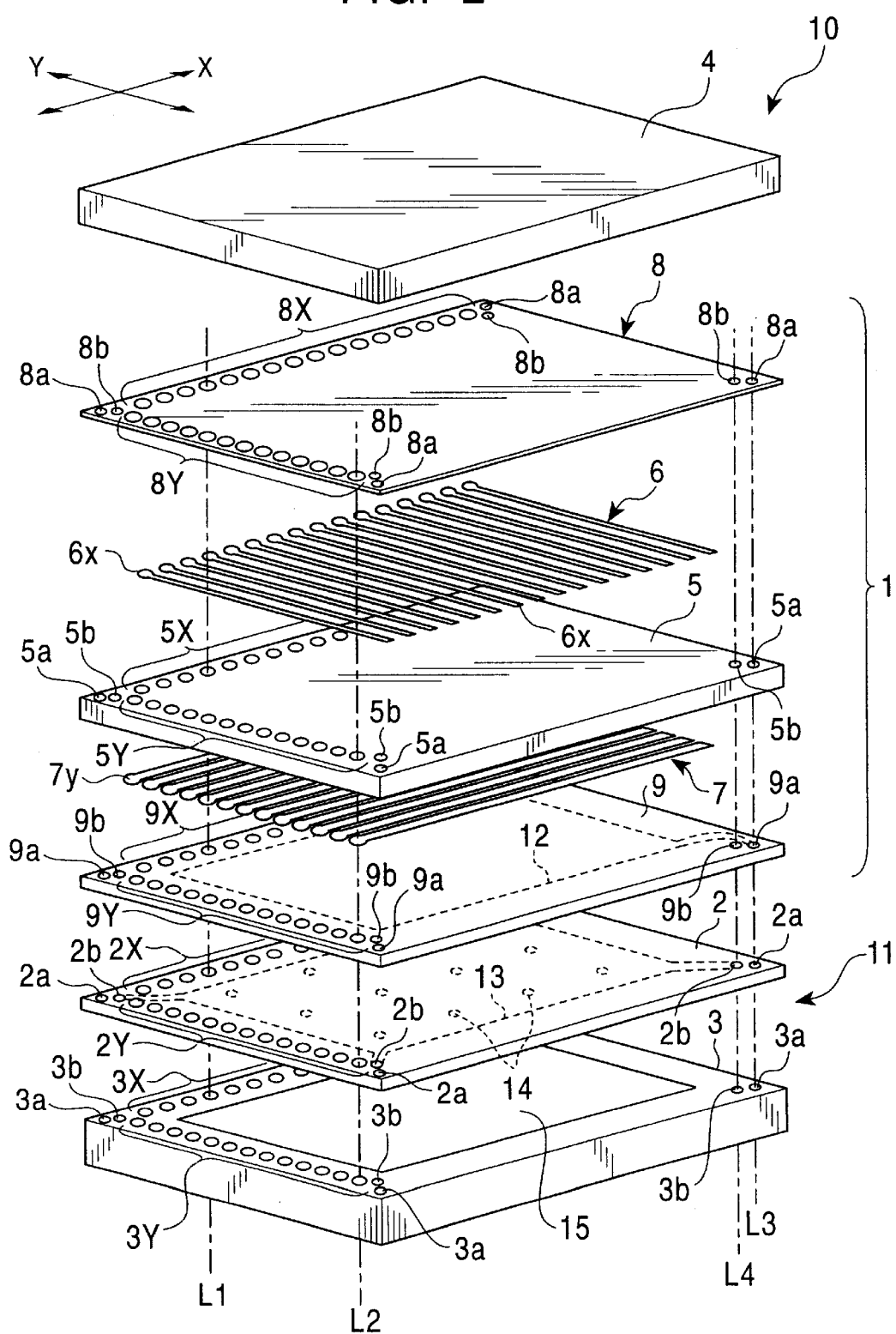
FIG. 2 is an assembly view of the coordinate input apparatus according to the present invention.
Figure 3:
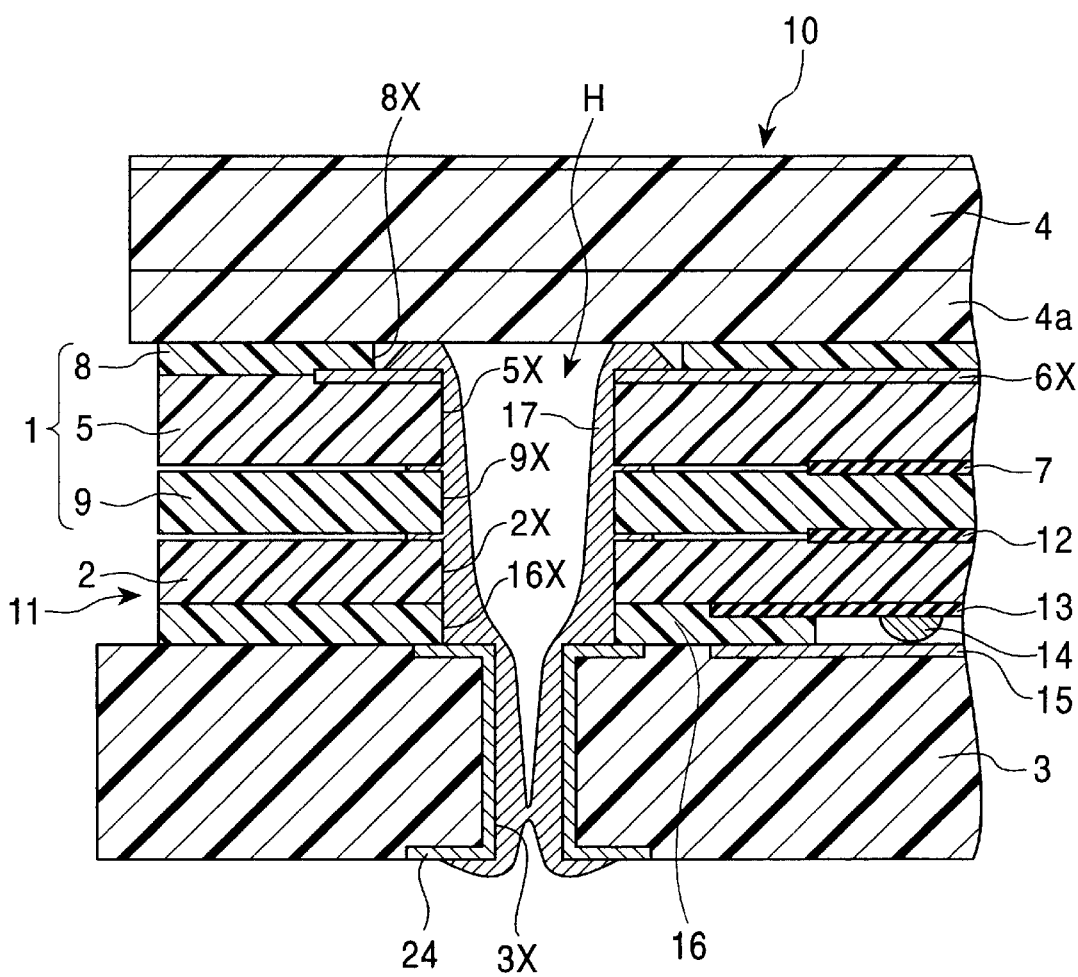
FIG. 3 is a fragmentary enlarged sectional view at the line L1 of FIG. 2.
Figure 4:
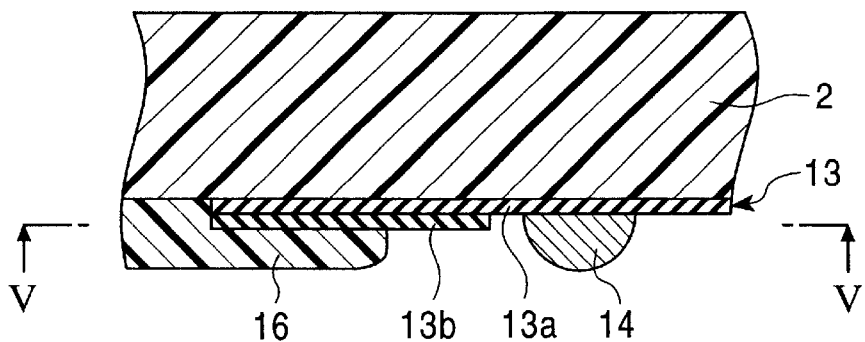
FIG. 4 is a sectional view showing part of a pressure-sensing detection section.
Figure 5:
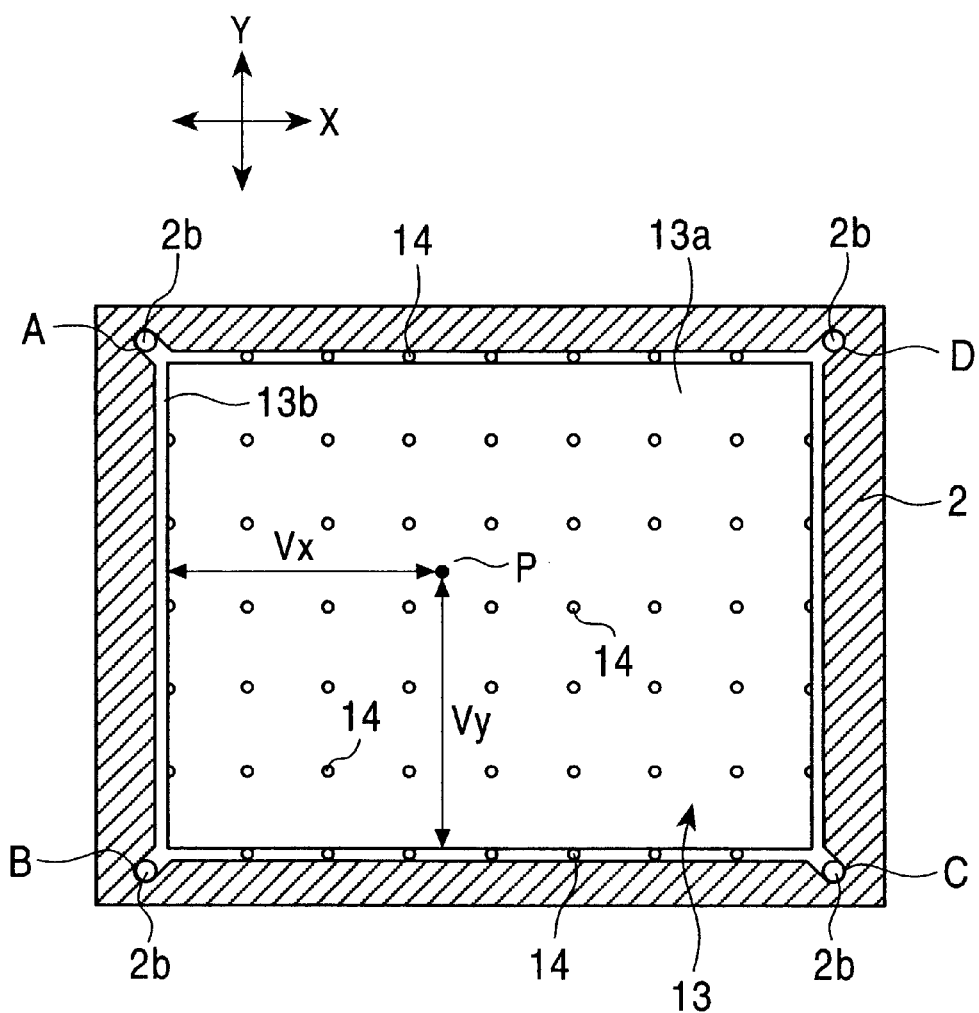
FIG. 5 is a sectional view at the line V—V of FIG. 4.
Figure 6:
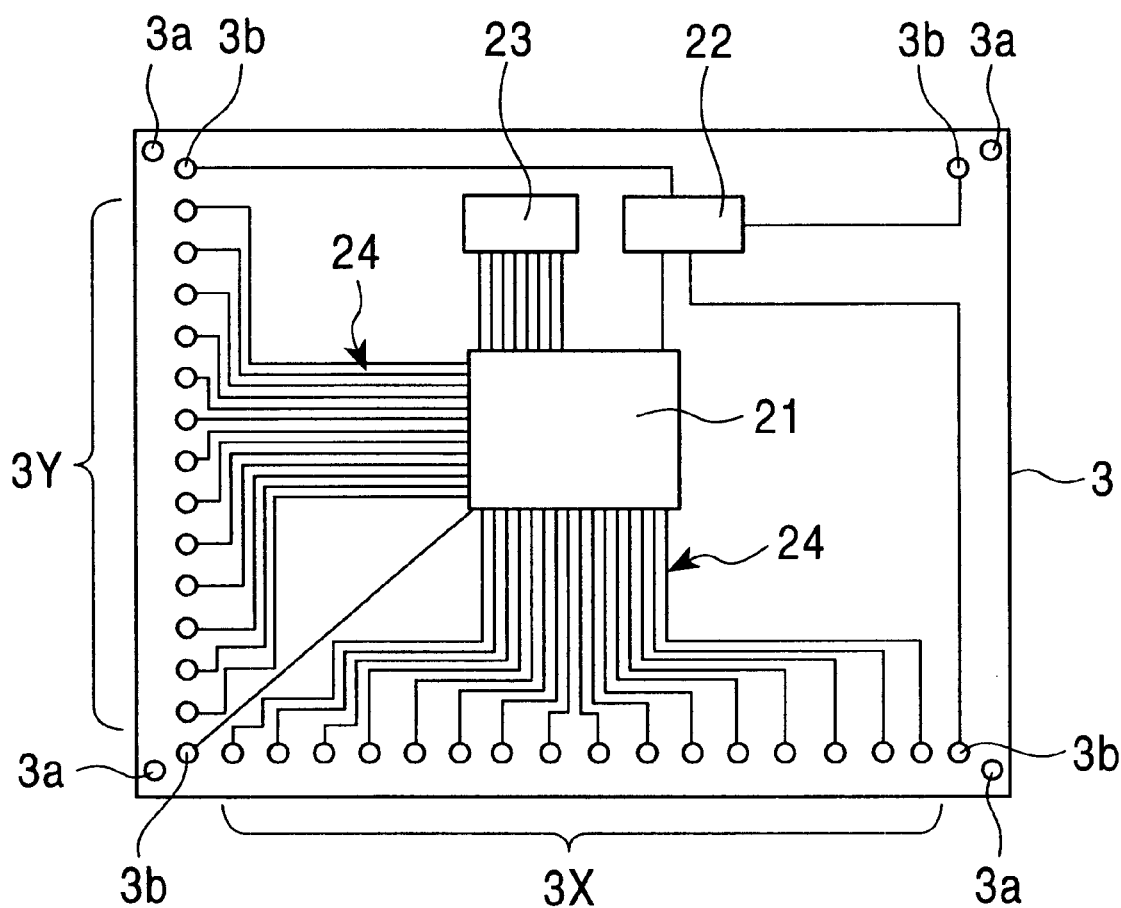
FIG. 6 is a backside view of a substrate disposed in the coordinate input apparatus according to the present invention.

FIG. 1 is a perspective view showing a configuration in use of a coordinate input apparatus according to the present invention; FIG. 2 is an assembly view of the coordinate input apparatus according to the present invention; FIG. 3 is a fragmentary enlarged sectional view at the line L1 of FIG. 2; FIG. 4 is a sectional view showing part of a pressure-sensing detection section; FIG. 5 is a sectional view at the line V—V of FIG. 4; and FIG. 6 is a backside view of a substrate disposed in the coordinate input apparatus.

As shown in FIG. 1, an input apparatus 10 used in a notebook personal computer 20 is assembled into a space disposed in the foreground of a keyboard body K. The input apparatus 10 is not necessarily integrated with the computer 20; it may be separately constructed so as to be connected thereto via a PS/2 interface or a USB interface.

As shown in FIG. 2, in the input apparatus 10, an electrostatic capacitive detection section 1 and a pressure-sensing detection section 11 are stacked; a face-sheet 4 is disposed on the top face of the electrostatic capacitive detection section 1; and a substrate 3 is arranged in the most bottom layer. In addition, the substrate 3 forms part of the pressure-sensing detection section 11.

The electrostatic capacitive detection section 1 comprises an X-direction-detection electrode 6, an Y-direction-detection electrode 7 disposed so as to oppose the X-direction-detection electrode 6 via a resin sheet 5 interposed therebetween, a resist film 8 disposed on the face of the X-direction-detection electrode 6, and an insulating resin sheet 9 disposed on the bottom face of the Y-direction-detection electrode 7.

The resin sheet 5 is formed to be a square sheet made from a resin such as PET (polyethylene terephthalate) and has an insulation resistance and a predetermined permitivity.

In one side of a fringe portion of the resin sheet 5, plural through-holes 5X, penetrating from one face of the sheet to the other face thereof, are formed in a line of an X axial direction while in another side thereof, plural through-holes 5Y, penetrating from one face of the sheet to the other face thereof, are formed in a line of an Y axial direction. Furthermore, at the four corners of the resin sheet 5, through-holes 5a for grounding are respectively formed, and in the vicinity of each through-hole 5a, another through-hole 5b is formed.

The X-direction-detection electrode 6 is formed by printing an Ag paste, etc., and has plural X electrodes 6x formed parallel to each other on the resin sheet 5. Similarly, the Y-direction-detection electrode 7 has plural Y electrodes 7y formed parallel to each other on the resin sheet 5.

The X-direction-detection electrode 6 and the Y-direction-detection electrode 7 are arranged so as to oppose each other interposing the resin sheet 5 therebetween, so that one end of each X electrode 6x is located over each through-hole 5X and that one end of each Y electrode 7y is located underneath each through-hole 5Y. As shown in FIG. 2, the X electrodes 6x and the Y electrodes 7y are disposed in a matrix arrangement.

The resist film 8 formed on a face of the X-direction-detection electrode 6 is formed by a printing method so as to cover one face of the X-direction-detection electrode 6. At this time, through-holes 8X penetrating the resist film 8 are formed at positions opposing to one end of each X electrode 6x while through-holes 8Y penetrating the resist film 8 are formed at positions opposing to one end of each Y electrode 7y. Through-holes 8a and 8b are also formed in the resist film 8 at positions corresponding to the through-holes 5a and 5b formed in the resin sheet 5, respectively.

The resin sheet 9 formed on the bottom face of the Y-direction-detection electrode 7 is made from PET, etc., having an insulation-resistance and a similar size to the resin sheet 5. At this time, through-holes 9X in the resin sheet 9 are formed at positions opposing to each through-hole 5X while through-holes 9Y are formed at positions opposing to each through-hole 5Y. Through-holes 9a and 9b are also formed at positions corresponding to the through-holes 5a and 5b, respectively.

On the bottom face (lower face) of the resin sheet 9 except a peripheral fringe portion, a ground layer 12 (area surrounded with the dotted line) is formed. The ground layer 12 is formed from a low resistance resistor such as an AG paste or a Cu foil. The ground layer 12 is formed so as to avoid the through-holes 9b and to extend to one of the through-holes 9a. Thereby, a shield for excluding an influence from the backside on the electrostatic capacitive detection section 1 is formed.

The pressure-sensing detection section 11 is formed in a gap between a resin sheet 2 and the substrate 3.

The resin sheet 2 is a sheet formed from an insulating resin such as PET. Through-holes 2X, 2Y, 2a, and 2b penetrating through the periphery of the resin sheet 2 are formed at positions opposing to the through-holes 9X, 9Y, 9a, and 9b, respectively.

As shown in FIG. 4, on the bottom face of the resin sheet 2, a resistance layer 13 is formed. As shown in FIGS. 4 and 5, the resistance layer 13 comprises a resistor 13a having a higher resistance and a resistor 13b having a lower resistance. The resistor 13a is formed square on the entire face except the periphery and the resistor 13b is laid up in the periphery of the resistor 13a. As resistance values of the resistors 13a and 13b at this time, it is preferable that a sheet resistance of the resistor 13a be approximately 100 k$\Omega$/area while a sheet resistance of the resistor 13b be approximately 40 k$\Omega$/area; however, the value is not limited to these. When a resistance ratio between the resistor 13a and the resistor 13b is excessively small, linearly plotted detection values having a constant inclination in the range from 0 to 5 v cannot be obtained.

The resistor 13b is formed of a continuous line and has extending portions to the through-holes 2b at four corners. On the faces of the resistors 13a and 13b, plural hemispherical spacers 14 having insulation are projectingly formed in X and Y axial directions at equal intervals.

Furthermore, the periphery of the resin sheet 2 is covered with a resist film 16. As shown in FIG. 3, through-holes 16X are formed on the resist film 16 at positions opposing to the through-holes 2X (identical to the through-holes 2Y, 2a, and 2b). At this time, the thickness of the resist film 16 and the diameter of the spacers 14 are set so that the top surface of the resist film 16 and the tops of spacers 14 are aligned. Thereby, a gap between the resistance layer 13 and a conductive pattern (conductor) 15 is maintained constant at any position.

The substrate 3 is made from a glass epoxy resin, etc., and on the face thereof opposing to the resistance layer 13, the conductive pattern 15 made from Cu or Au is formed. Through-holes 3X, 3Y, 3a, and 3b are formed in the substrate 3 at positions opposing to the through-holes 2X, 2Y, 2a, and 2b, respectively. In the through-holes 3X, 3Y, 3a, and 3b, as shown in FIG. 3, electrodes 24 made from a copper foil, etc., are formed ranging from the top face to the back face of the substrate 3.

In addition, although not shown in the drawing, the conductive pattern 15 is provided with a continuity portion to be connected to the backside of the substrate 3.

As shown in FIG. 6, on the back face of the substrate 3, electronic circuit elements constituting a controlling and detecting section 21, a power supply circuit 22, a memory section 23, and so forth are mounted. On the substrate 3, the electrodes 24 are provided for electrically connecting between the controlling and detecting section 21 and the through-holes 3X and 3Y. The controlling and detecting section 21 converts the inputted operating signal into a predetermined format. The power supply circuit 22 is electrically connected to the through-holes 3b, so that a predetermined voltage is applied across each through-hole 3b. From the memory section, an inputted signal is sent to a computer.

The face-sheet 4 is formed by a resin sheet such as PET and fixed on the face of the resist film 8 by an adhesive, etc. The face of the face-sheet 4 may be coated so as to have a contracted face.

By the structure described above, each X electrode 6x of the electrostatic capacitive detection section 1 is continued to the through-holes 8X, 5X, 9X, 2X, 16X, and 3X as shown by the line L1 of FIG. 2. As shown in FIG. 3, a penetrating hole H formed by the through-holes 8X, 5X, 9X, 2X, 16X, and 3X is filled with an AG paste as a conductive material 17 from the side of the resist film 8 or the substrate 3, so that the X electrodes 6x are electrically connected to the electrodes 24 formed on the substrate 3. In FIG. 3, the conductive material 17 is not connected to any one of the Y electrodes 7y, the ground layer 12, and the resistance layer 13.

As shown by the line L2 of FIG. 2, each Y electrode 7y is continued to the through-holes 8Y, 5Y, 9Y, and 3Y. A penetrating hole formed by the through-holes 8Y, 5Y, 9Y, and 3Y is filled with the conductive material 17, so that the Y electrodes 7y are electrically connected only to the substrate 3.

As shown by the line L3 of FIG. 2, through-holes 8a, 5a, 9a, 2a, and 3a are continuously formed, and a penetrating hole formed by these through-holes 8a, 5a, 9a, 2a, and 3a is filled with the conductive material 17, so that the ground layer 12 is grounded so as to shield the electrostatic capacitive detection section 1.

Furthermore, as shown by the line L4, through-holes 8b, 5b, 9b, 2b, and 3b are continuously formed, and a penetrating hole formed by these through-holes 8b, 5b, 9b, 2b, and 3b is filled with the conductive material 17, so that the resistance layer 13 is electrically connected only to the substrate 3. Although not shown in the drawing, the through-hole formed in the resist film 16 is part of the penetrating holes.

After each through-hole is filled with the conductive material 17 in such a manner, the face-sheet 4 is fixed to the top face of the apparatus by providing an adhesive layer between the face-sheet 4 and the resist film 8.

The electrostatic capacitive detection section 1 in the input apparatus 10 is formed to have such a softness level that when the surface of the face-sheet 4 is operated by a non-conductor such as a pen, the resin sheet 2 of the pressure-sensing detection section 11 is deflected.

Next, the operation of the input apparatus 10 will be described.

When an operator operates the input apparatus 10 with a conductor such as a finger, the detection is performed by the electrostatic capacitive detection section 1 so as to be continued until the time that the detected value cannot be obtained. When an operator operates the input apparatus 10 with a non-conductor such as a pen, the detection is by the pressure-sensing detection section 11 so as to be continued until the time that the detected value is not outputted. Regardless of the operation with whether the conductor or the non-conductor, the detection may be performed alternately by the electrostatic capacitive detection section 1 and the pressure-sensing detection section 11.

When the input apparatus 10 is operated with a finger, in the X-direction-detection electrode 6 and the Y-direction-detection electrode 7 formed so as to interpose the resin sheet 5 therebetween, part of a line of electric force proceeding from the X-direction-detection electrode 6 toward the Y-direction-detection electrode 7 is absorbed into the finger of an operator; the number of electric lines of force absorbed into the Y-direction-detection electrode 7 is thereby reduced, so that a phenomenon of variations in the electrostatic capacity occurs. Based on an output current changing in accordance with the capacity variations, the coordinates of a position depressed with a finger can be detected. The detection is executed by electronic circuit elements which are mounted on the back face of the substrate 3 for forming the controlling and detecting section 21, as shown in FIG. 6.

When the input apparatus 10 is operated with a pen, the electrostatic capacitive detection section 1 is deflected so as to activate the pressure-sensing detection section 11 below the section 1. When described referring to FIG. 5, a voltage of 0 V is applied to points A and B in the resistor 13b by the power supply circuit 22 shown in FIG. 6 while 5 V is applied to points C and D, so that the electric potential can be substantially linearly changed in the range of 0 to 5 V from the AB side to the CD side in the X direction. Also, a voltage of 0 V is applied to points B and C while 5 V is applied to points A and D, so that the electric potential can be substantially linearly changed in the range of 0 to 5 V from the BC side to the AD side in the Y direction. In such a manner described above, voltages time shared so that electric potentials in the X direction and the Y direction are alternately changed are applied thereto.

When the point P of FIG. 5 is depressed with a pen, for example, the resistor 13a having a higher resistance makes contact with the conductive pattern 15 at the point P. A voltage Vx between the interval between A and B of the resistor 13b having a lower resistance and the conductive pattern 15 being contact with the point P is detected according to a resistance value corresponding to the distance between the interval between A and B of the resistor 13b and the point P. Similarly, a voltage Vy between the resistor 13b and the conductive pattern 15 is obtained according to the distance between the interval between B and C of the resistor 13b and the point P. The voltages Vx and Vy are detected in the controlling and detecting section 21 disposed on the substrate 3 so as to recognize the coordinates of the point P.

As shown in FIG. 5, since the resistance layer 13 of the pressure-sensing detection section 11 is constructed such that the resistor 13b having a lower resistance is formed around the periphery of the resistor 13a having a higher resistance, when voltages are applied across the resistor 13a alternately in the X and Y directions, voltage leakages in the X and Y directions are reduced and variations in the electric potentials between C and D and between A and D can also be reduced.

Although not shown in the drawing, a pattern for escaping static electricity may be arranged at a position in the X-direction-detection electrode 6 side that does not make contact with the X electrodes 6x or in the Y-direction-detection electrode 7 side that does not make contact with the Y electrodes 7y in the peripheral portion of the resin sheet 5. A pattern for grounding at this time can escape static electricity to the outside of the input apparatus 10 via the through-holes 8a, 5a, 9a, 2a, and 3a.

What is claimed is:

1. A coordinate input apparatus comprising:

an electrostatic capacitive detection section for detecting coordinates by operating the electrostatic capacitive detection section with an indicator so as to change an electrostatic capacitance between an X electrode and an Y electrode, which are arranged so as to oppose each other via an insulating layer interposed therebetween; and a pressure-sensing detection section having a resistor and a conductor arranged so as to oppose the resistor, the pressure-sensing detection section detecting coordinates based on a resistance of the resistor at a contact point between the resistor and the conductor when being operated with a predetermined pressure, wherein the electrostatic capacitive detection section is deposited on an operating surface side of the pressure-sensing detection section, wherein the electrostatic capacitive detection section is flexible and is capable of being pressed against the pressure-sensing detection section, and wherein the pressure-sensing detection section comprises a high resistance resistor and a low resistance resistor arranged around the high resistance resistor, a voltage being applied alternately between low resistance resistor portions opposing in an X direction and between low resistance resistor portions opposing in an Y direction so that coordinates are detected based on a voltage detected between the low resistance resistor and the conductor by causing the conductor to make contact with the high resistance resistor.

2. A coordinate input apparatus according to claim 1, further comprising a substrate arranged in the pressure-sensing detection section opposite to the electrostatic capacitive detection section, the substrate having through-holes penetrating from one face of the substrate toward another face thereof, the through-hole penetrating through both the electrostatic capacitive detection section and the pressure-sensing detection section so that the X and Y electrodes of the electrostatic capacitive detection section are each connected to the substrate via the through-hole by filling the through-hole with a conductive material.

3. A coordinate input apparatus according to claim 1, further comprising a substrate arranged in the pressure-sensing detection section opposite to the electrostatic capacitive detection section, the substrate having through-holes penetrating from one face of the substrate toward another face thereof, the through-hole penetrating through both the electrostatic capacitive detection section and the pressure-sensing detection section so that the low resistance resistor and the conductor of the pressure-sensing detection section are each connected to the substrate via the through-hole by filling the through-hole with a conductive material.

4. A coordinate input apparatus according to claim 2, wherein the substrate comprises a circuit element mounted on a backside of the substrate for operating the electrostatic capacitive detection section, the circuit element and the through-hole being connected via a circuit pattern formed on the backside of the substrate.

5. A coordinate input apparatus according to claim 3, wherein the substrate comprises a circuit element mounted on a backside of the substrate for operating the pressure-sensing detection section, the circuit element and the through-hole being connected via a circuit pattern formed on the backside of the substrate.

6. A coordinate input apparatus according to claim 1, wherein the electrostatic capacitive detection section comprises a face-sheet arranged on the operating face side of the electrostatic capacitive detection section via an insulator disposed therebetween.

* * * * *